(12) United States Patent
Ambrose

(10) Patent No.: US 6,698,979 B1
(45) Date of Patent: Mar. 2, 2004

(54) WIRE AND CABLE INSTALLATION TOOL

(76) Inventor: David M. Ambrose, 12706 Westchester Plz., Omaha, NE (US) 68154

( * ) Notice: Subject to any disclaimer, the term of this patent is extended or adjusted under 35 U.S.C. 154(b) by 0 days.

(21) Appl. No.: 10/367,772

(22) Filed: Feb. 19, 2003

(51) Int. Cl.$^7$ .................................................. H02G 1/00
(52) U.S. Cl. ........................................ 405/180; 37/367
(58) Field of Search ................................ 405/180–184; 37/367

(56) References Cited

U.S. PATENT DOCUMENTS

| | | | |
|---|---|---|---|
| 3,561,222 A | 2/1971 | Sweeton et al. | |
| 3,639,193 A | 2/1972 | Hawkins | |
| 3,872,806 A | 3/1975 | Bone | |
| 4,069,845 A | 1/1978 | Ward | |
| D249,223 S | 9/1978 | Holden | |
| 4,164,982 A | * 8/1979 | Draney | 405/182 |
| 4,395,959 A | 8/1983 | Dale | |
| 4,620,889 A | 11/1986 | Winter et al. | |
| 4,637,755 A | 1/1987 | Tollefson et al. | |
| 4,661,019 A | 4/1987 | McLaughlin | |
| D292,262 S | 10/1987 | Chaney | |
| D297,702 S | 9/1988 | Persson | |
| 4,834,581 A | 5/1989 | Soules, Jr. | |
| 5,529,129 A | 6/1996 | Byrd | |
| 5,639,183 A | * 6/1997 | Griffioen et al. | 405/183.5 |
| 5,669,543 A | 9/1997 | Ueno | |
| 5,884,901 A | 3/1999 | Schilling | |
| 5,887,855 A | 3/1999 | Whitney et al. | |
| 6,260,631 B1 | 7/2001 | Torrez | |
| D466,381 S | * 12/2002 | Joseph | D8/18 |

* cited by examiner

*Primary Examiner*—Thomas B. Will
*Assistant Examiner*—Tara L. Mayo
(74) *Attorney, Agent, or Firm*—Dowell & Dowell, P.C.

(57) ABSTRACT

A hand tool for subsurface placement of wires, cables and other elongated strand-like elements into soil and like materials wherein the tool includes a body having a front tapered penetration end. The tool is generally hollow having a channel which extends from a rear portion of the body to a discharge opening adjacent the penetration end. The tool may include an elongated tortuous slot formed in a side wall of the body through which the wires and cables may be laterally inserted into the channel.

14 Claims, 3 Drawing Sheets

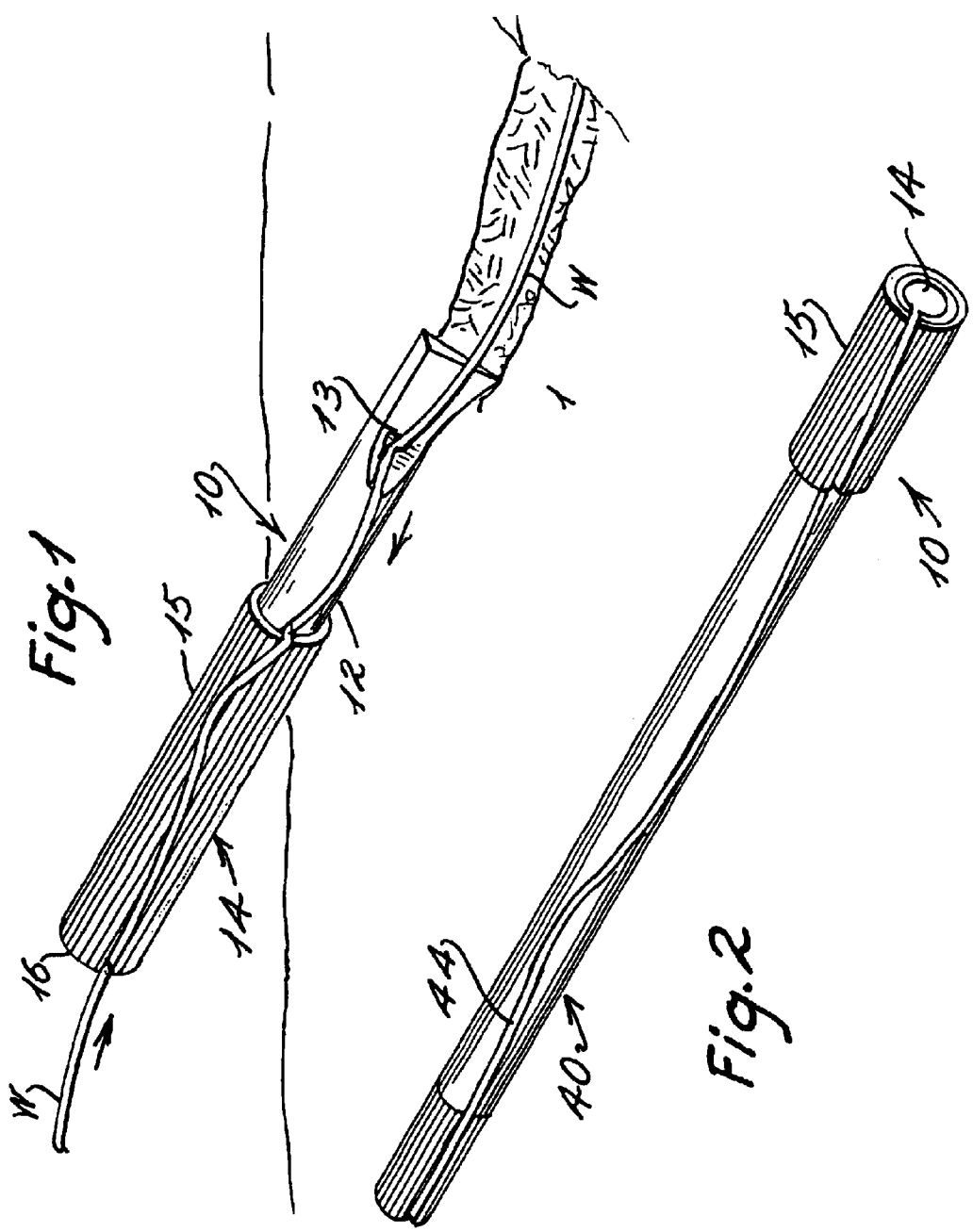

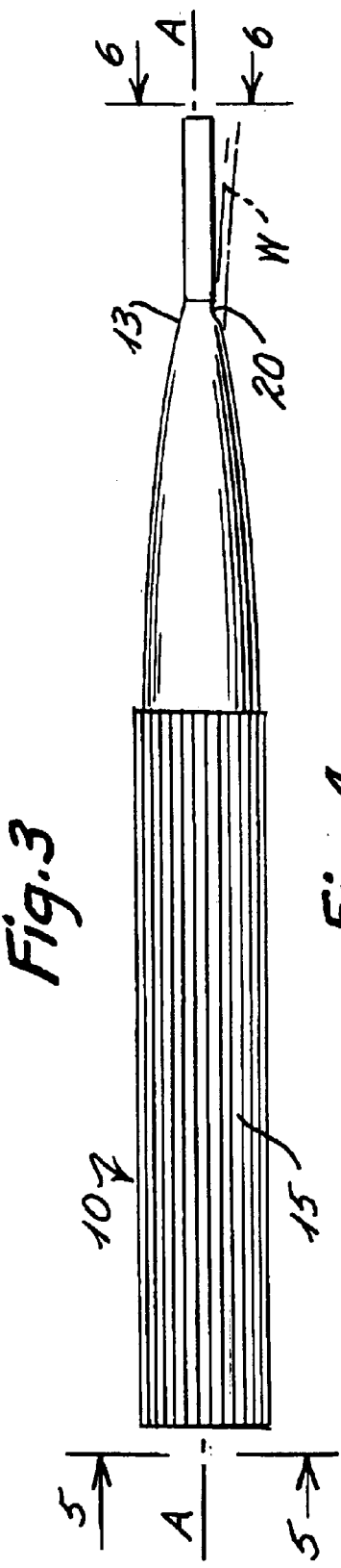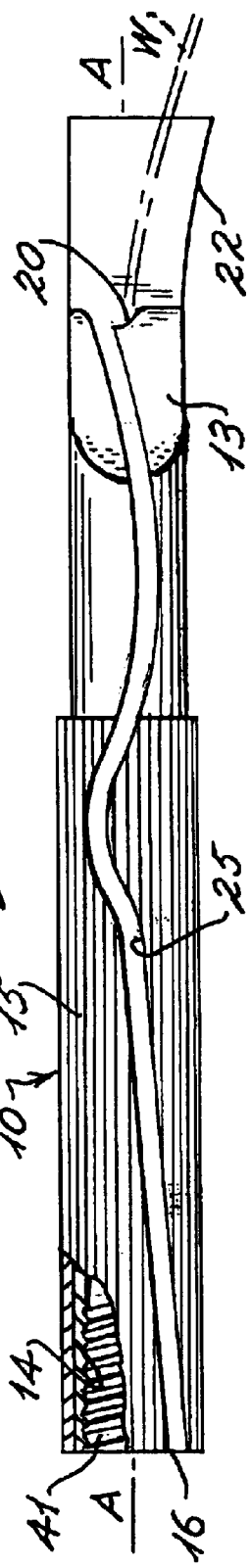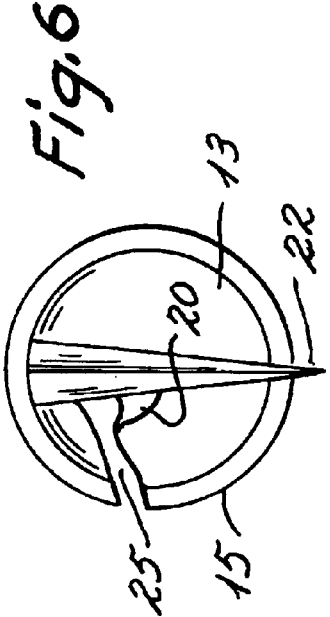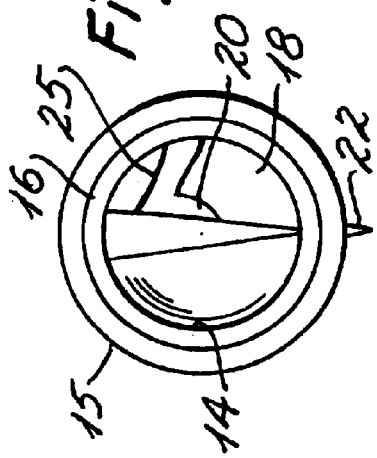

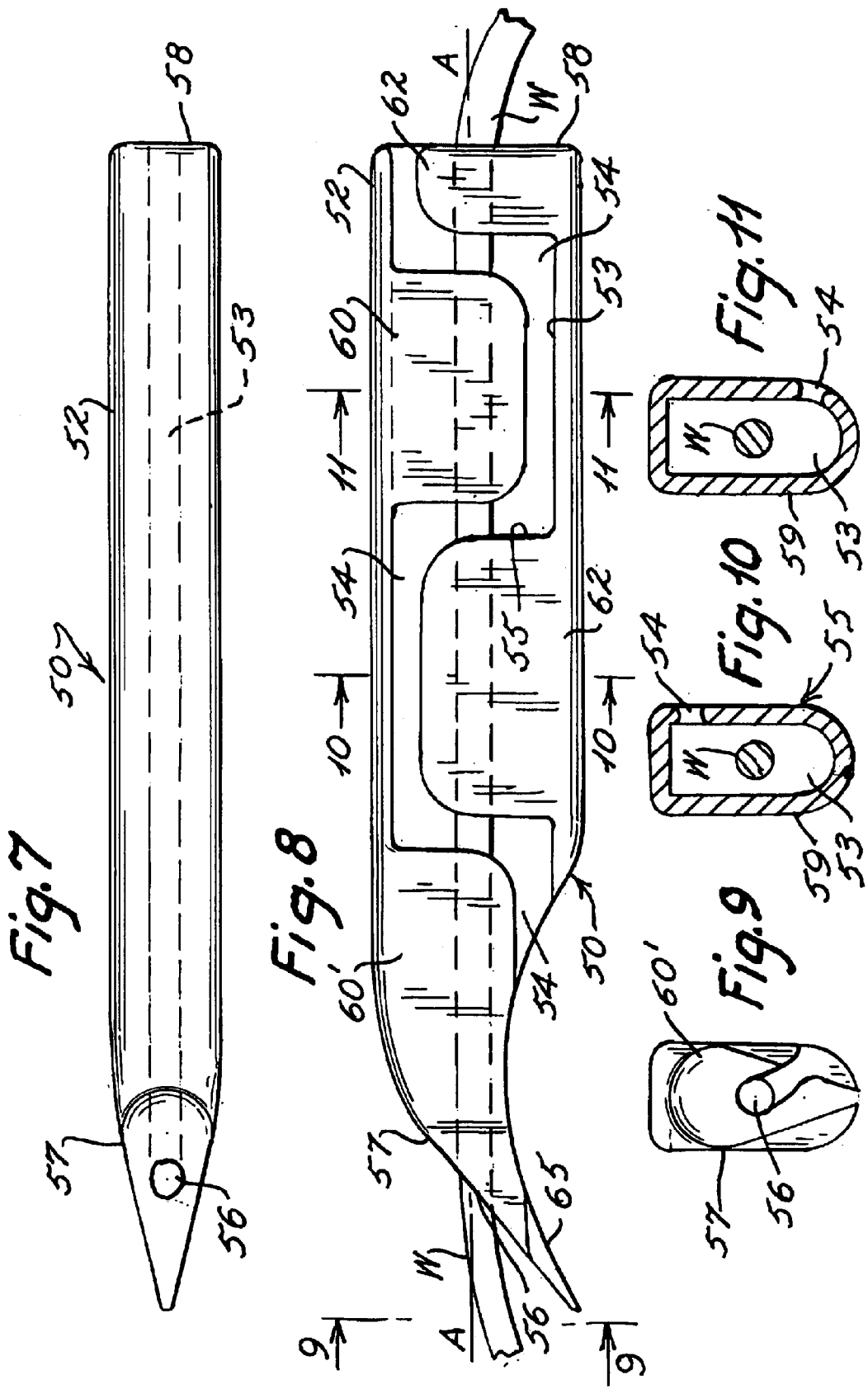

WIRE AND CABLE INSTALLATION TOOL

BACKGROUND OF THE INVENTION

1. Field of the Invention

This invention is generally directed to tools for the subsurface installation of wires, cables and flexible conduits used for communications and security or invisible fences. The tools include a surface penetration portion at one end and a handle at the other. The tools are hollow and are designed to convey a wire or cable therethrough as they are pulled through a penetrable surface material such as soil, sand, wet concrete and the like.

2. Description of Related Art

A number of machines and hand held tools have been developed for the subsurface installation of elongated electrical wires and cables and fiber optic cables. Machines for installing subsurface wires and cables are generally of two types. A first type is designed to make surface cuts in soil to form elongated open slits or trenches in which wire or cable is laid by feeding the wire or cable from a supply reel to a discharge guide which is mounted so as to be in trailing relationship with respect to a soil cutter. Many such machines are prohibitively expensive or are too large, heavy or complex to make them well suited for certain types of subsurface wire or cable installations.

The other type of subsurface installation machine is designed to introduce wire or cable through the soil by burrowing beneath the soil without cutting through the surface. Such machines for feeding cable through the subsurface without topsoil penetration are quite elaborate and costly, and such machines require a great deal of expertise and manpower to effectively place the cable or wire.

In many situations, it is preferred to use a hand held device for the placement of at least portions of subsurface wires and cables. Also, in many instances, it is desired that a subsurface wire or cable be placed in relative close proximity to the soil surface thus requiring a minimal cut to be made in the soil to provide an open trench in which to place cable or wire. In these instances, the use of heavy machinery is not economical. Further, the use of machinery often disturbs adjacent soil areas and it is often desirable to place subsurface wires and cables in such a manner so as to minimize disruption or damage to adjacent surface areas.

Therefore, a number of hand held wire and cable installation tools have been developed for installing wires or cables, such as used in communication, security or invisible fencing systems.

Most conventional hand held tools are designed with a wire or cable feed end portion and a handle element. The wire is generally fed through the body of the tool which is hollow or contains a:n elongated open channel. The wire or cable is fed from the handle end toward the discharge or feed end and thus, in many instances, there is a requirement to splice wire or cable along its length when it is desired to place an intermediate segment of a continuous portion of a wire or cable due to the need to feed the wire or cable from one end of the tool to the other.

In view of the foregoing, there remains a need to provide a relatively inexpensive and minimally ground invasive hand tool which can be used to place or install subsurface wiring either in soft materials such as sand, gravel, wet cement and the like or within pre-cut trenches or slits created by conventional soil cutting tools and machines.

There is a further need to provide for inexpensive and yet easily used hand tools for subsurface wire or cable placement wherein the tools are capable of placing intermediate sections of continuous lines, wires or cables without requiring feeding of the wires or cables from one end of a tool to another end.

SUMMARY OF THE INVENTION

The present invention is directed to hand held tools for the subsurface installation of wires, cables and the like wherein the tools include a first end having a ground penetrating portion adjacent to which is a discharge opening through which wire or cable being placed is discharged as the tools are moved through subsurface soil which is either pre-cut or loose, such as sand and gravel. The tools further include a handle portion which, is some preferred embodiments, may include a grip to facilitate handling during use.

The body of each tool includes an open channel which extends from the handle end of the tool to the discharge opening. In preferred embodiments, wire or cable is inserted within the tool through a serpentined or tortuous opening or slot formed in a sidewall of the tool body, such that a segment of wire or cable may be inserted through the opening or slot into the channel without having to feed the wire or cable from one end of the tool to the other. The configuration of the opening prevents accidental displacement of the wire or cable laterally of the channel during use of the tool.

In a first embodiment, the tool body is formed of a tubular structure of a size or dimension to be easily grasped in an installer's hand. The tortuous opening is formed as a serpentined slot in a side wall of the tubular structure which slot extends from one end of the tool body to the other.

In another embodiment, the tool body is formed of a metallic or plastic material which is rolled or molded into a somewhat tubular configuration and such that projections extending from opposing elongated edges of the body interdigitate in spaced relationship with one another to thereby define a tortuous elongated opening through which wire or cable may be inserted laterally into an open channel defined within the body.

The tools may be made in differing sizes and supplemental handles may be provided for permitting use of the tools from a standing position to further facilitate the placement of wires and cables by installers.

It is the primary object of the invention to provide inexpensive, lightweight and easily manipulated hand tools for subsurface placement of wires and cables within loose materials such as sand, gravel, soils, non set cement and the like.

It is another object of the invention to provide hand held tools for subsurface placement of cables and wires which can be used to install intermediate segments of elongated sections of wire or cable without having to feed the wire or cable from one end to another end of the tools, such that selected segments of wire or cable can be easily inserted laterally within the tools for installation.

It is a further object of the invention to provide hand held tools for subsurface placement of wires, cables and the like wherein the tools may be utilized either as a short hand tool or can be mounted on supplemental handles allowing use of the tools by installers from a standing position.

It is yet a further object of the present invention to provide hand held tools which may be utilized to place single or multiple strands of wires and cables simultaneously.

BRIEF DESCRIPTION OF DRAWINGS

A better understanding of the invention will be had with respect to the accompanying drawings wherein:

FIG. 1 is a perspective illustrational view of a first embodiment of a tool showing wire being fed as the tool is pulled through loose material;

FIG. 2 is a partial perspective view of an elongated handle attached to the tool of FIG. 1;

FIG. 3 is a top plan view of the tool of FIG. 1;

FIG. 4 is a side view of the tool of FIG. 1;

FIG. 5 is a rear elevational view taken along line 5—5 of FIG. 1;

FIG. 6 is a front elevational view taken along line 6—6 of FIG. 1.

FIG. 7 is a top plan view of a second embodiment of tool in accordance with the invention;

FIG. 8 is a left side view of the tool of FIG. 7 showing a wire or cable extending therethrough;

FIG. 9 is a front elevational view taken along line 9—9 of FIG. 8;

FIG. 10 is a cross-sectional view taken along line 10—10 of FIG. 8; and

FIG. 11 is a cross-sectional view taken along line 11—11 of FIG. 8.

DESCRIPTION OF PREFERRED EMBODIMENTS

With continued reference to drawing FIGS. 1–6, a first embodiment of hand tool 10 of the present invention which is specifically designed for the subsurface installation of communication and electrical wires and cables including fiber optic cables, invisible fence wires, conventional telephone, television and multi-media cables and other similar type elements, wherein such elements are to be placed in soft, loose, or cut soils, sand, wet concrete or other materials that are either pre-cut or capable of being penetrated by the application of manual pressure on the tool. The tool includes a generally hollow body 12 having an inwardly tapered and substantially closed forward end portion 13 and a handle portion 14. In the embodiment shown in FIG. 1, the handle is covered by a rubber or synthetic material grip 15 which may be ribbed to facilitate handling. The rear end 16 of the tool is generally open such that the interior of the body defines an open channel 18 through which one or more strands of wire or cable may be fed or conveyed towards a discharge opening 20 formed adjacent to, but spaced rearwardly of the forward end portion 13 of the tool.

The forward end 13 of the tool includes a cutting or inclined penetrating edge 22 which extends forwardly of the discharge opening 20. The edge is formed so as to extend outwardly from a central elongated axis A—A of the tool, as shown in FIGS. 3 and 4, such that the edge may be used as a separating or cutting element to urge the tool into a penetrating relationship with respect to the material in which the wire or cable being conveyed through the tool is to be placed or installed, as shown in FIG. 1.

The body 12 of the tool may be formed of plastic, wood, fiberglass, or metal, however, durable materials such as an aluminum or a heavy grade of plastic are preferred.

In order that an intermediate section of cable can be installed utilizing the tool 10 of the present invention without the requirement for feeding the wire or cable from the rear end 16 toward the discharge opening 20, in preferred embodiments, an open slot 25 is provided through a side wall of the tool body which extends from the rear end 16 to the discharge opening 20. As shown, the slot is curvilinear or tortuous in configuration such that it does not follow a continuous straight line. In this manner, a segment of wire or cable may be inserted laterally through the slot 25 and into the hollow channel 18 without having to feed the wire from one end of the tool to the other. The curved walls of the slot prevent the wire or cable from being accidentally displaced from the channel 18 as the wire or cable is conveyed or directed through the tool during placement.

The configuration of the tool may vary. In the drawing figures, the tool body is generally tubular such that a cross section of the tool body is generally circular. Other configurations may be used in accordance with the teachings of the present invention, such as square, triangular or oval tubing. The diameter or cross sectional dimension may also vary depending upon the type of wires or cables and the number of wires or cables to be conveyed through the tool at a given time. The cross sectional dimension, however, should be such as to make the tool comfortable to hold in an installer's hand.

In one embodiment, the body of the tool may be approximately seven to eight inches in length, such that the tool is easily manipulated by the handle 14. However, in some instances, it may be desired to extend the length of the tool depending upon other requirements and the depth of cable or wire placement.

To further facilitate the use of the tool 10, it may be desired to provide an auxiliary elongated hollow handle which allows the tool to be used by an individual from a standing position. As shown in FIG. 2, an elongated auxiliary handle 40 is shown having screw threads (not shown) which are designed to be cooperatively received with screw threads 41 provided within the interior of the rear end 16 of the tool body, see FIG. 4. To facilitate the placement of wires and cables within the slot 25 in the tool body, one or more elongated slots 44 are provided along at least a portion of the auxiliary handle. By securing the auxiliary handle by threading to the tool body 12 and aligning the slots 44 and 25, it is possible to insert wires or cable laterally into the channel 18, as previously described, for feeding and subsurface placement.

As opposed to the threaded connection described, other types of connections for securing the auxiliary handle to the tool may be used.

In use, one or more strands or sections of cable or wire "W" are inserted into the channel 18 of the tool 10 such that a portion of the wire or cable extends outwardly of the discharge opening 20 while remote sections extend outwardly from the rear end 16. Thereafter, by applying pressure to the cutting edge 22 into a soft soil or a pre-cut soil, sand, concrete or other material, and pulling the tool in a direction toward the rear of the handle as the cutting edge penetrates into the material, the wire or cable is grasped by the material closing about the forward end 13 of the tool so that the wire or cable is placed or embedded as the tool is pulled relative to the wire or cable.

As previously described, in preferred embodiments, the continuous slot 25 is provided in the side of the tool. If it becomes necessary to place or install an intermediate segment of an elongated wire or cable without installing or placing other portions of the wire or cable, the wire or cable is simply introduced into the tool through the elongated side slot without the requirement to feed the entire wire or cable from a free end thereof.

With particular reference to FIGS. 8–11, another embodiment of the invention is shown. In this embodiment the tool 50 includes a body 52 which is formed by rolling, folding or molding a metal or plastic material into a somewhat tubular configuration. As shown, however, the cross sectional dimensions of the body are generally oblong. Further, a continuous serpentine or tortuous opening or slot 54 is created along one side wall 55 of the body and extends from a discharge opening 56 at a front end 57 of the body to a rear portion 58 of the body. The opening 54 communicates with an open channel 53 which extends along the full length of the tool body.

In the present embodiment, the opposite side wall 59 of the body is generally continuous with no openings therein whereas the side wall 55 is formed by projections or flanges 60 and 62 which extend from opposing edges 61 and 63, respectively, which define the upper and lower portions of the left side wall. As shown, the projections 60 and 62 interdigitate in spaced relationship with one another and thereby define the elongated tortuous opening 54. Further, the forward most projection 60' and the opposing portion of side wall 59 extend forwardly and are curved and tapered toward one another to form a somewhat pointed cutting or penetrating edge 65 at the front end 57 of the tool. As with the previous embodiment, the penetrating edge extends outwardly relative to an elongated axis A—A of the tool 50.

The width of the opening 54 is such as to permit wires or cables to be inserted laterally therethrough so that the wires or cables can be placed within the channel 53 without having to be fed from one end of the tool to the other. Also, the number of interdigitated projections may vary and remain within the teachings of the invention.

The tool 50 is used in the same manner as described with respect to the tool 10 and auxiliary handles may also be used. Further, a separate grip may be applied about the body 52 but without interfering with the open slot 54.

As opposed to using the tools as a hand tools, the structure of the tools could be slightly modified to allow them to be mounted on machines for the subsurface placement of wires or cables. The essential elements of the tools would remain generally the same such that the tools include bodies having a central channel through which the wire cable is fed from one end towards a discharge opening spaced from the cutting or penetrating edge. Further, the rear end and discharge openings may be communicated by an openings or tortuous slots through the side walls of the tool bodies, as previously described, to thereby facilitate the placement or loading of wires or cables within the tools.

The foregoing description of the preferred embodiments of the invention has been presented to illustrate the principles of the invention and not to limit the invention to the particular embodiments illustrated. It is intended that the scope of the invention be defined by all of the embodiments encompassed within the following claims and their equivalents.

I claim:

1. A tool for the subsurface placement of wires, cables, and other elongated strand-like elements into a penetrable material, the tool comprising a body having a forward portion and a rear portion, said forward portion including a tapered penetrating edge, a channel extending through said body from an opening at said rear portion of said body to and communicating with a discharge opening adjacent said penetrating edge, and a continuous tortuous slot in a sidewall of said body extending from said discharge opening to said rear portion of said body such that said slot is in open communication along its length with said channel, such that a segment of the wire, cable and other elongated strand-like element may be inserted laterally through said slot into said channel so that the wire, cable and other elongated strand-like element extends from said rear portion and through said discharge opening of said body.

2. The tool of claim 1 in which said discharge opening is spaced rearwardly of a tip portion of said penetrating edge toward said rear portion of said body.

3. The tool of claim 2 wherein said body defines a handle to be grasped during use of the tool.

4. The tool of claim 3 including a hand grip mounted about said handle.

5. The tool of claim 4 in which said forward portion of said tool body tapers to a closed end extending toward said penetrating edge.

6. The tool of claim 5 including an auxiliary elongated handle and means for securing said elongated handle to said rear portion of said body.

7. The tool of claim 6 in which at least a portion of said auxiliary handle includes a slot through a sidewall thereof.

8. The tool of claim 5 in which said discharge opening is spaced rearwardly of said closed end toward the said rear portion of said body.

9. The tool of claim 1 including an auxiliary elongated handle and means for securing said elongated handle to said rear portion of said body.

10. The tool of claim 9 in which at least a portion of said auxiliary handle includes a slot through a sidewall thereof.

11. The tool of claim 1 wherein said tapered penetrating edge protrudes outwardly relatively to central elongated central axis of said body.

12. The tool of claim 1 wherein said body is generally tubular.

13. The tool of claim 1 wherein said body includes opposite side walls, one of said side walls having a plurality of interdigitated projections which are spaced from one another to define said tortuous slot therebetween.

14. The tool of claim 13 including an auxiliary elongated handle and means for securing said elongated handle to said rear portion of said body.

* * * * *